Sept. 10, 1929.  J. J. McCABE  1,727,888
LENS DRILL
Filed March 4, 1926  5 Sheets-Sheet 1

INVENTOR
Joseph J. McCabe
BY
his ATTORNEYS

Sept. 10, 1929.   J. J. McCABE   1,727,888
LENS DRILL
Filed March 4, 1926   5 Sheets-Sheet 3

INVENTOR
Joseph J. McCabe
BY
his ATTORNEYS

Sept. 10, 1929.　　　　J. J. McCABE　　　　1,727,888
LENS DRILL
Filed March 4, 1926　　　5 Sheets-Sheet 4
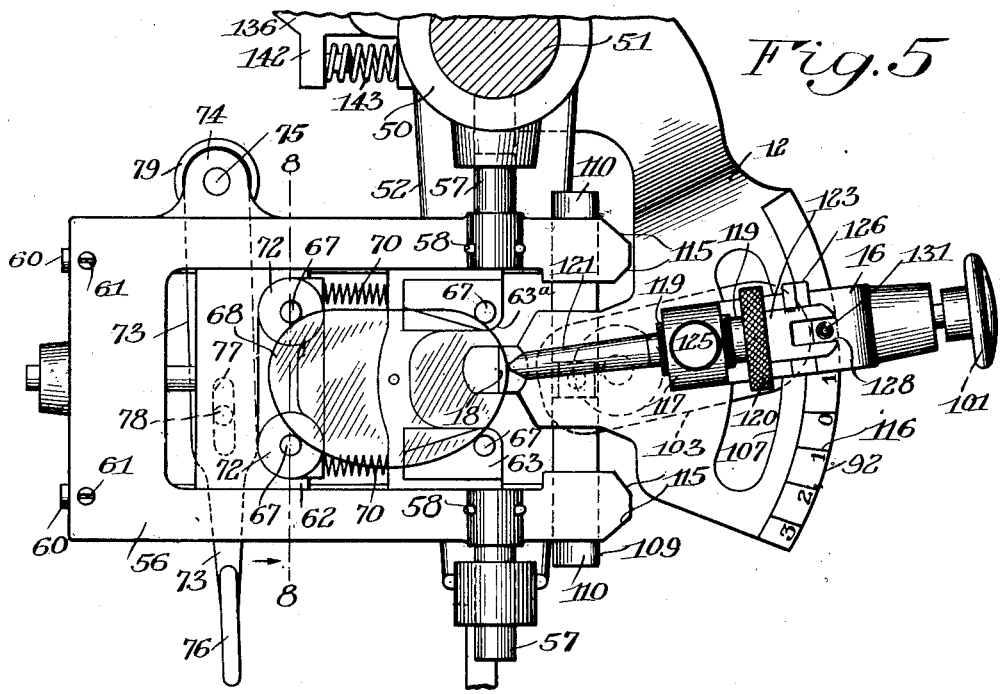
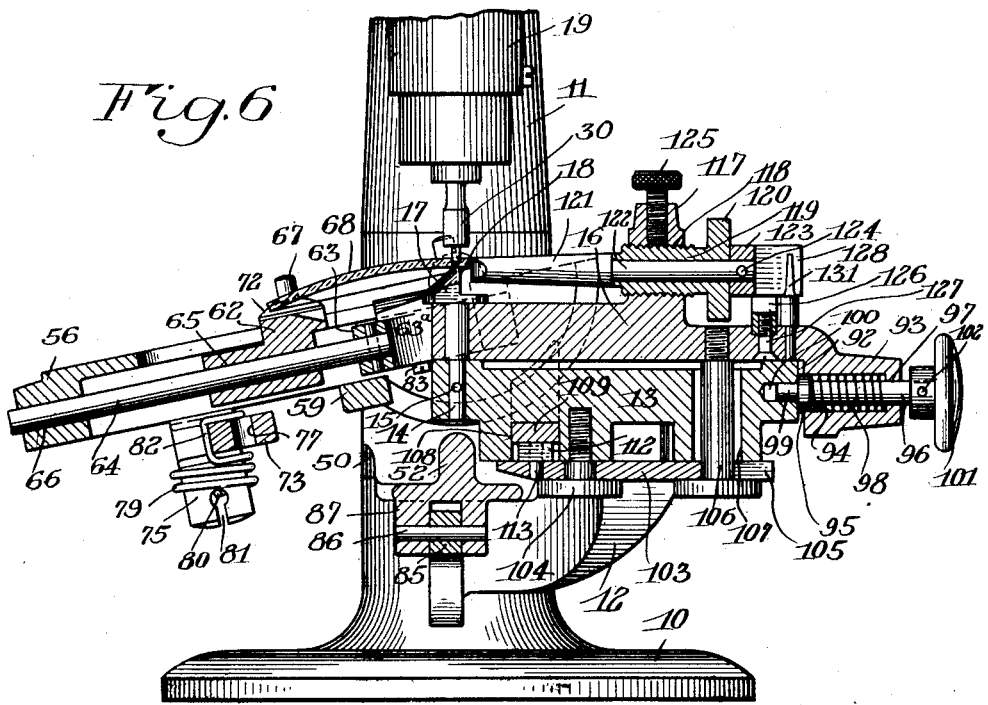
INVENTOR
Joseph J. McCabe
BY
his ATTORNEYS Sept. 10, 1929.      J. J. McCABE      1,727,888
LENS DRILL
Filed March 4, 1926      5 Sheets-Sheet 5
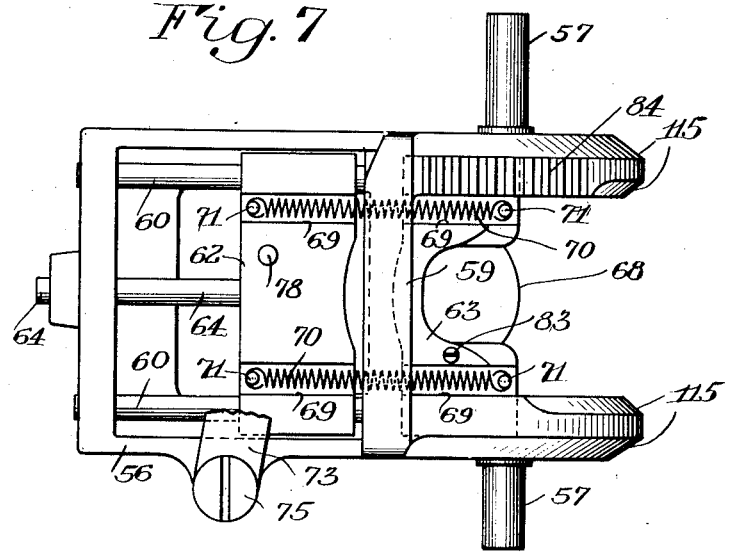
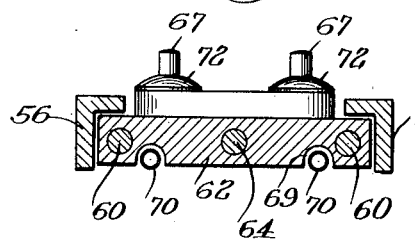
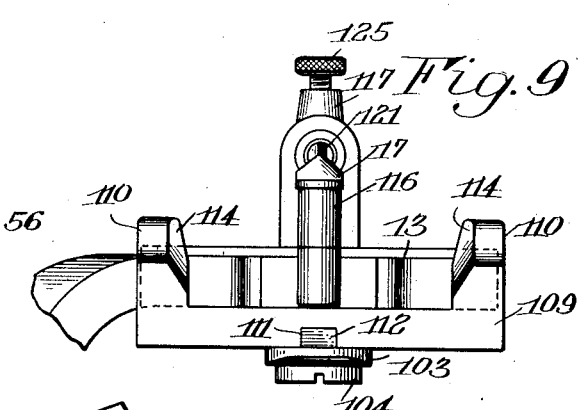
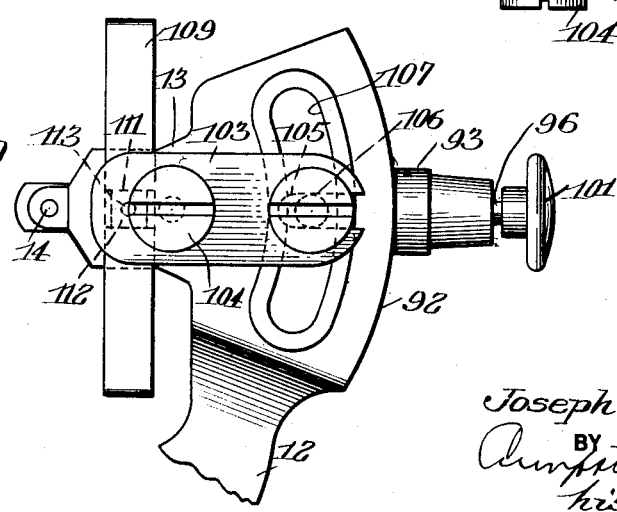
INVENTOR
Joseph J. McCabe
BY
his ATTORNEYS Patented Sept. 10, 1929.

1,727,888

UNITED STATES PATENT OFFICE.

JOSEPH J. McCABE, OF ROCHESTER, NEW YORK, ASSIGNOR TO BAUSCH & LOMB OPTICAL CO., OF ROCHESTER, NEW YORK, A CORPORATION OF NEW YORK.

LENS DRILL.

Application filed March 4, 1926. Serial No. 92,266.

This invention relates to improvements in drills, and particularly to the type adapted for the drilling of ophthalmic lenses.

In drilling ophthalmic lenses for the reception of mountings and for other purposes, it is customary to drill part way through the lens from one side, and then to reverse the lens and drill from the opposite side until the drill holes meet and form an aperture. The aperture is then reamed and finished to the desired size. It is always desirable to position the drill as nearly normal to the surface being drilled as possible, and where the lens is curved, this is a difficult matter, unless the mounting of the lens is adjustable. In prior drills the means for receiving the lens to be drilled and supporting it in a position over a drilling support or anvil and beneath the drill spindle, is usually so close to the spindle that the insertion or removal of a lens is hindered more or less by the close proximity of the drill spindle.

Various limit gauges are commonly provided for locating the edge of the lens at such a desired distance from the axes of the drill spindle that the aperture will be placed a suitable desired distance from the edge of the lens, as determined by the particular eye piece frame or lens mount to which it is desired to attach the lens after the drilling is completed. There is considerable variation in the construction of these eye piece frames or mountings, and therefore, it has been necessary heretofore to measure as accurately as possible, the distance between the apertures of the clamping ears of the mounting and the flanges of the mounting that extend along the peripheral edge of the lens, and then set the limit gauge to a reading corresponding to that distance. With such measurement, and the setting of the limit gauge entirely by readings, errors by the operator are quite possible, either in making a reading or in setting the gauge, with the result that the hole is frequently not properly located.

It is frequently desirable to offcenter the lens to some extent in drilling the holes, and such offcentering has heretofore been more or less inaccurate or speculation.

The drills are commonly operated by small driving belts operating upon a driving pulley carried by the drill spindle, the belts being conducted to the drill at times from above the bench on which the drill is mounted and at times below it. It is, therefore, desirable to have a drill which may be operated without changing its construction by belts coming from either above or below the bench surface on which it is mounted, and to enable the making of changes in the tautness of the belt as required.

An object of the invention is to provide an improved drill construction in which lenses of varying sizes and curvatures may be supported and held while being drilled; with which the lens after mounting may be tilted into different angular positions in order to position the surface of the lens at the point of drilling approximately normal to the drill, whether the surface which is being drilled is concave or convex; with which the lens supporting means may be shifted away from the drilling position in order to facilitate the mounting or removal of the lenses; with which the lens may be shifted transversely of the axes of drilling spindle for offcentering purposes in a simple, accurate and effective manner; with which the position of a limit gauge for determining the extent that the edge of the lens being drilled extends beyond the axis of the drill, may be determined directly from the eye piece frame or mounting in which the lens is to be secured after being drilled, thereby obtaining the location of the hole being drilled exactly in accordance with the dimensions of the eye piece clamp in which the lens is to be mounted; which may be operated by a driving belt coming from either above or below the surface of the bench on which the drill is mounted; and with which the driving belt may be tightened or loosened as desired in a simple manner.

A further object is to generally improve and simplify lens drills of this type, with which the liability to gumming from the drilling fluids commonly employed will be minimized; which will enable more accurate and rapid drilling of a lens to be effected, the manipulation of the drill simplified, and which will be relatively simple and inexpensive.

Various other objects and advantages will appear from the following description of one embodiment of the invention, and various novel features will be particularly referred to and pointed out in the appended claims.

In the accompanying drawing:

Figure 5 is a plan similar to Figure 3, but illustrates the mounting of a lens of a slightly different type such as a drop-oval lens, which has been offcentered for drilling;

Figure 6 is a sectional elevation of a portion of the drill, with the section taken approximately along the line 6—6 of Figure 3;

Figure 7 is a plan of the underface of the lens chuck;

Figure 8 is a sectional elevation of a portion of the chuck, with the section taken approximately along the line 8—8 of Figure 5;

Figure 9 is an elevation of a part of the off-centering mechanism; and

Figure 10 is a bottom plan of part of the offcentering mechanism.

Figure 1:
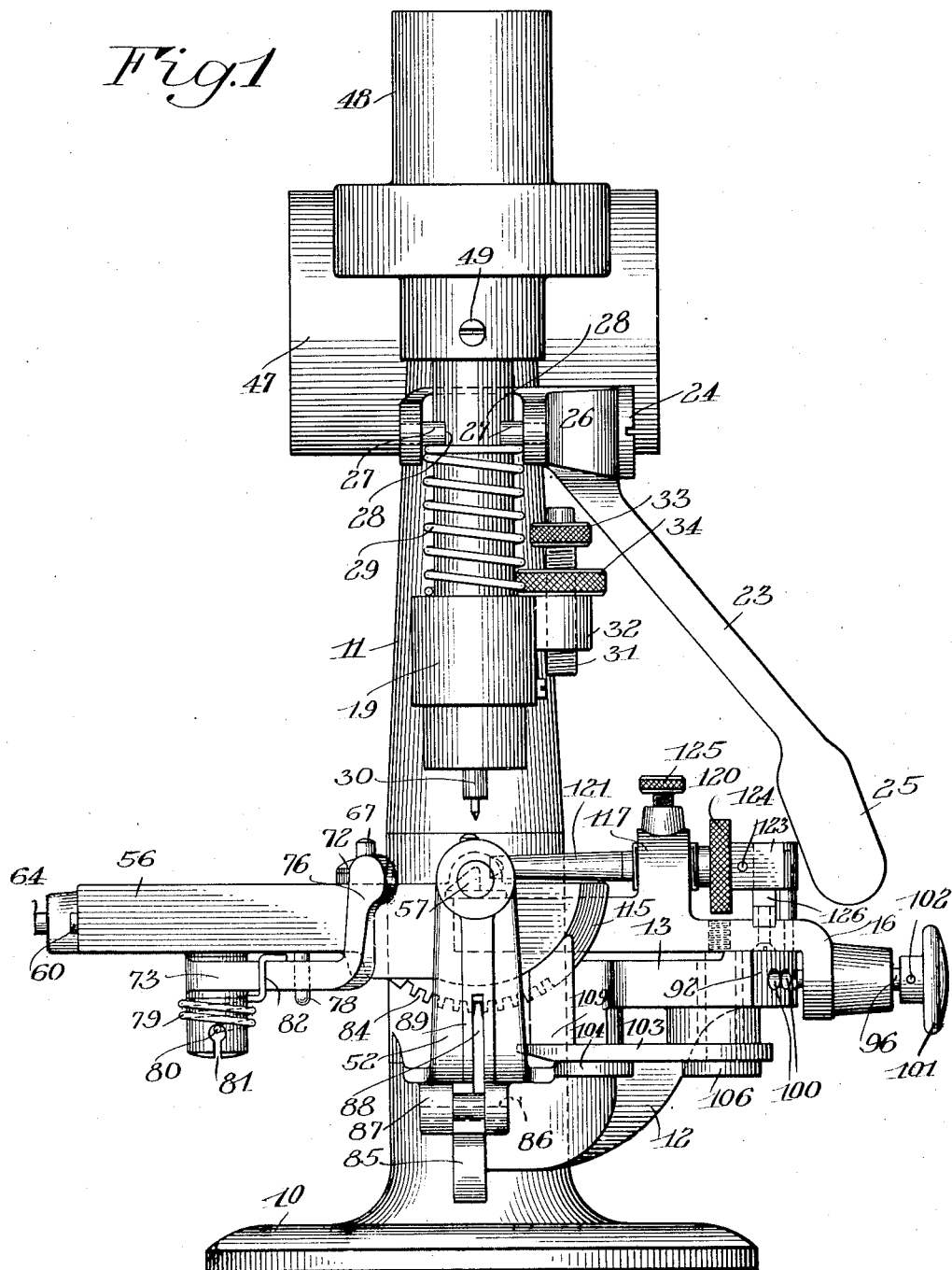
Figure 1 is a front elevation of a lens drill constructed in accordance with this invention.

In the illustrated embodiment of the invention, the frame of the drill includes a base portion 10 from which an upright standard portion 11 extends. A bracket arm 12 extends from the lower part of the upright standard 11, and terminates forwardly of the standard in a platform or plate 13.

Referring particularly now to Figure 6, the platform or plate 13 carries an upstanding pin 14 locked against rotation by a transverse pin 15 which passes through an aperture in the pin 14 and through an adjacent part of the platform 13. The portion of the pin 14 directly above the platform is cylindrical, so as to serve as a bearing pintle for an arm 16, the arm being confined thereon by a head 17 of the pintle having the shape of an anvil or rest, against which the lens may be pressed while being drilled. The anvil head of the bearing pintle is provided with an abrupt wall 18, located adjacent to its upper tip end portion against which the drilling thrust is applied, and with the remainder of the upper surface of the head convergent towards that wall.

Figure 2:
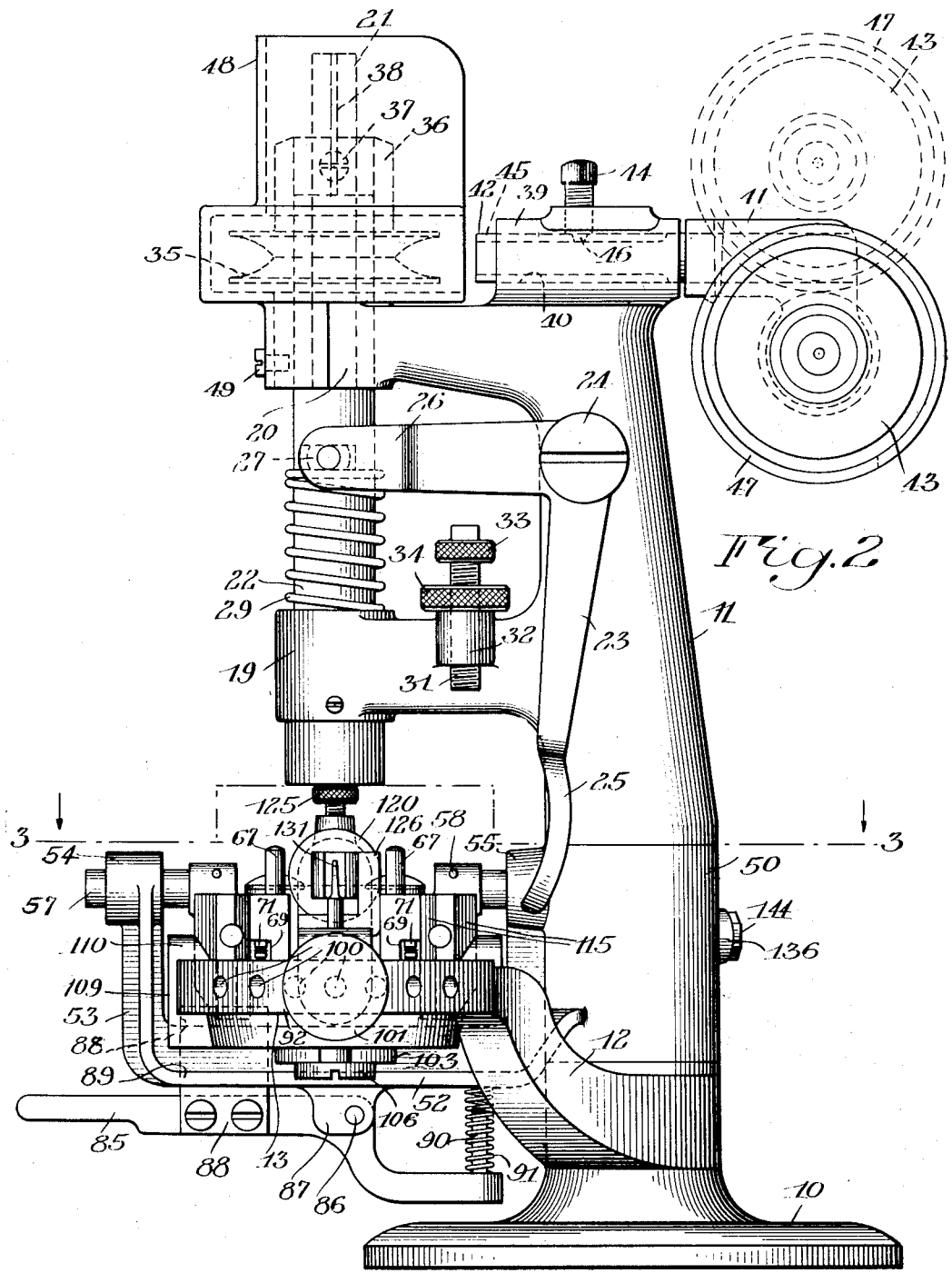
Figure 2 is a side elevation of the same.

Referring now particularly to Figure 2, the upright standard 11 is provided with forwardly extended arms 19 and 20 at different elevations, the two arms serving as bearing supports for the drilling spindle 21. The spindle is rotatably mounted in suitable bushings in the bearing arms 19 and 20, and moves through a sleeve 22 disposed between the two arms 19 and 20 and slidingly received in the upper part of the lower arm 19. The sleeve 22 is connected to the spindle so as to be shiftable endwise therewith, and permitting free independent rotation of the spindle. Such a connection may be obtained, for example, by providing the sleeve 22 with an internal projecting pin (not shown) which runs in an annular groove (not shown) in the spindle.

A bell crank lever arm 23 is pivoted to the standard 11 in any suitable manner, such as by a shoulder pivot screw 24 which passes through the lever and is threaded into the standard. One arm of the lever extends downwardly and terminates in an operating handle 25, and the other arm of the lever extends forwardly and terminates in a forked end 26 which embraces the sleeve 22. Suitable lugs or shoes 27 (see Figures 1 and 2) are secured to the inner faces of the arms of the forked end 26, so as to slide in slots 28 provided upon opposite sides of the sleeve 22. Thus when the bell crank 23 is rocked, the forked end will reciprocate the sleeve 22 and by it reciprocate the spindle vertically.

A helical compression spring 29 may be provided around the sleeve 22, under compression between the upper face of the arm 19 and the lugs 27 of the bell crank, so as to normally urge the sleeve, and through it the spindle, upwardly until the sleeve strikes against the under-surface of the arm 20. A suitable drill 30 may be removably secured in the lower end of the spindle.

In order to limit the downward movement of the spindle during a drilling operation, a screw 31 (Figures 1 and 2) may be threaded through an ear 32 of the standard arm 19, so as to extend upwardly therefrom beneath the forked arm 26 of the bell crank. The upper end of the screw may have a knurled button portion 33, by which it may be threaded through the ear 32 to various extents, and a knurled lock nut may be threaded upon the screw 31 above the ear 32, so as to engage therewith and lock the screw in any position to which it may be adjusted by its rotation. Thus by elevating or lowering the screw 31 the limit to which the bell crank may be oscillated in order to depress the drill spindle, may be determined and varied as required.

An operating pulley 35 may be slidingly keyed upon the spindle portion which extends above the standard arm 20, so that it will always rotate with the spindle while permitting separate independent vertical adjustments of the spindle in the manner just explained. For example, the pulley may have an upwardly extending boss 36 carrying a transversely extending screw 37, terminating in a flat end where it extends into the bore of the pulley for engagement in a key way 38 of the drill spindle 21. The upper end of the standard 11 may be provided with a projecting boss portion 39 (see Figure 2) which is provided with a socket or passage 40 in substantially the plane of the belt contact surface of the pulley 35.

An idler bracket 41 is provided with a stem 42 which is slidably and rotatably received in the socket or passage 40, so as to move toward and from the operating pulley 35. The idler bracket 41 supports two grooved belt pulleys 43 for rotation upon a common axis at such a vertical level that a plane through the center belt contact surface of the operating pulley 35 will be approximately tangent to the corresponding contact surfaces of the pulleys 43. The pulleys 43 are also spaced apart by such an amount that the planes of their belt contact surfaces will be approximately tangent to the operating pulley 35. Thus a belt (not shown) running over the idler pulleys 43 and around the operating pulley 35 will run properly with relation to the pulley 35, whether the idler bracket is in the position shown in full lines in Figure 2, or in the dotted line position shown in Figure 2. When the driving belt comes from below, the idler bracket will be positioned as shown in full lines in Figure 2, and when coming from above the drill, the idler bracket will be rotated in the socket 40 until it is in the position shown in dotted lines in Figure 2, in both of which positions the belt will run properly to and from the pulley 35. In either position of the idler bracket, it may be adjusted endwise in the socket 40 in order to tighten or loosen the operating belt.

A set screw 44 may be provided in the projection 39 to engage with the stem 42 and hold the idler bracket in different adjusted positions in which it may be placed. The stem may have oppositely disposed longitudinally extending keyways 45, with which a reduced tip end 46 of the set screw 44 may engage. Thus by slightly loosening the screw 44, the stem 42 will be released for sliding movement in order to tighten or loosen the driving belt and then it may be clamped in adjusted position by tightening of the screw 44. During such endwise movement of the stem, the continued engagement of the tip end 46 of the screw in the keyway will prevent rotation of the idler bracket. In order to rotate the idler bracket it will be necessary to first loosen the screw 44 until the tip end 46 is entirely withdrawn from one of the keyways 45 in which it may be placed.

The idler bracket pulley may be enclosed to some extent by a cylindrical shell extension 47 of the brackets (see Figures 1 and 2). A guard shell 48 may be secured, such as by a screw 49, to the outer end of the upper standard arm, so as to surround the front and side portions of the supporting pulley 35 and the upper end of the drill spindle.

The upright standard 11 on the frame is provided, intermediate of its ends, with a revolving sleeve 50. For example, the upper and lower sections of the standard 11 may be connected together by a rod 51 which at its ends is removably received in suitable sockets in the upper end of the lower section of the standard, and in the lower end of the other section of the standard, with the sleeve 50 rotatably received between the upper and lower sections and upon the rod (see Figures 2, 3 and 5). An arm 52 extends forwardly from the sleeve 50 and terminates in an upstanding arm 53 the latter being provided at its upper end with a bearing 54 which is aligned with a bearing bracket 55 provided directly upon the sleeve 50.

A platform or sub-frame 56 is provided with aligned oppositely extending trunnions 57, which are slidably and rotatably received in the aligned bearings 54 and 55. Thus the platform or sub-frame 56 may rock about the axes of the trunnions 57, or slide toward and from the upright standard by sliding of the trunnions in its bearings. The engagement of the sub-frame or platform with the bearings 54 and 55 serves to limit its sliding movement to a desired range, without the disengagement of the trunnions from their bearings or supports. The two trunnions may comprise pins which are received in sockets in the sub-frame or platform and locked therein, against both rotation and endwise movement, in any suitable or desired manner, such as by pins 58 which are driven through aligned passages of both the trunnion pins and sockets of the platform or sub-frame in which the trunnion pins are received, as will appear from Figures 2 and 5.

The sub-frame or platform is somewhat U shaped with a bar 59 (see Figures 6 and 7) connecting the two side arms of the U at a short distance from their free ends, and upon their under-faces. Guide rods 60 extend through and are anchored in the cross arm portion of the sub-frame or platform (see Figures 3, 4 and 7), and extend along the side arm portions of the platform, being anchored at their forward ends in sockets or recesses provided in the forward ends of the arms of the U. The rods 60 may be secured against movement in any suitable manner, such as by the use of locking pins 61 (see Figures 3 and 5).

The lens mounting chuck may comprise two blocks 62 and 63, which are mounted to slide upon the rods 60 in tandem fashion, and within and extending across the sub-frame or platform. These blocks may have apertures through which the rods 60 pass in order to form the sliding supports. A rod 64 may be secured to one of the blocks, such as 63, and extend slidably through an aperture 65 (see Figure 6) in the other chuck block, and slidably through an aperture 66 in the cross arm portion of the sub-frame or platform. Thus the two chuck blocks will be freely slidable along the two guide rods 60, and further held against tilting or binding on the guides 60 by reason of the additional guide rod 64, which is carried by one of the chuck blocks and slidably received by the other chuck block and the sub-frame or platform.

Figure 3:
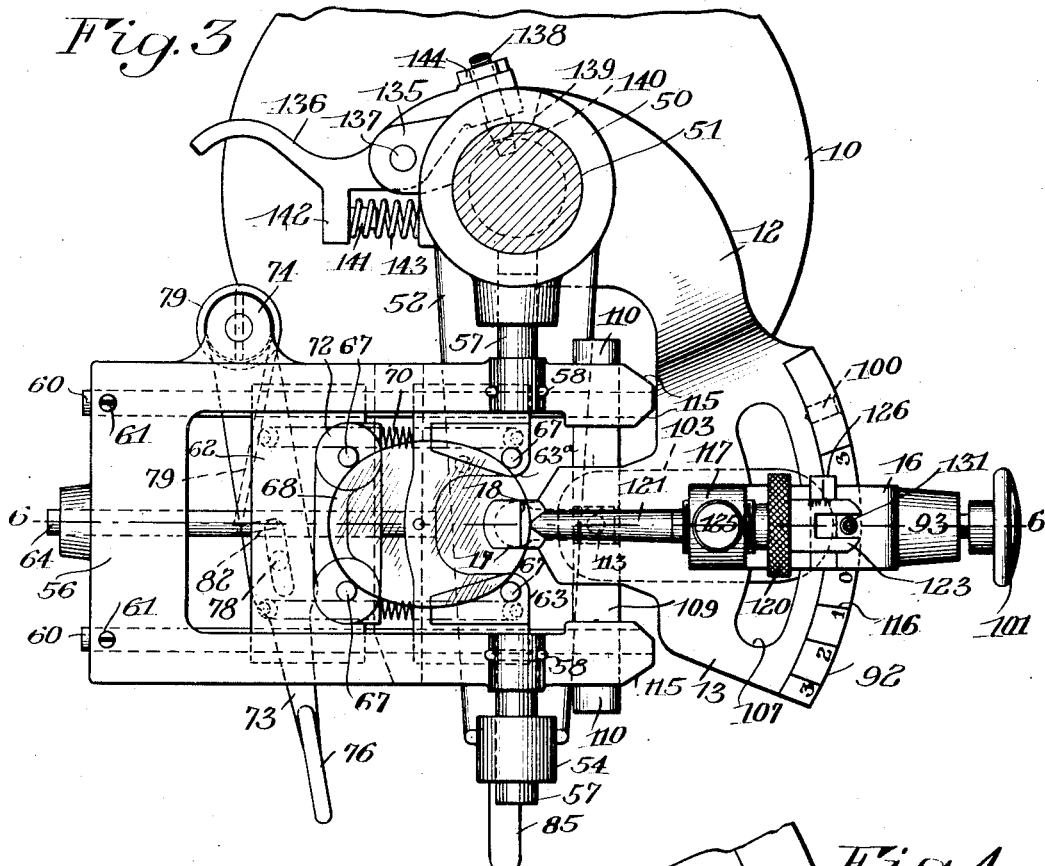
Figure 3 is a sectional plan of the lower portion of the same, with a lens mounted in drilling position, the section being taken approximately along the line 3—3 of Figure 2.
Figure 4:
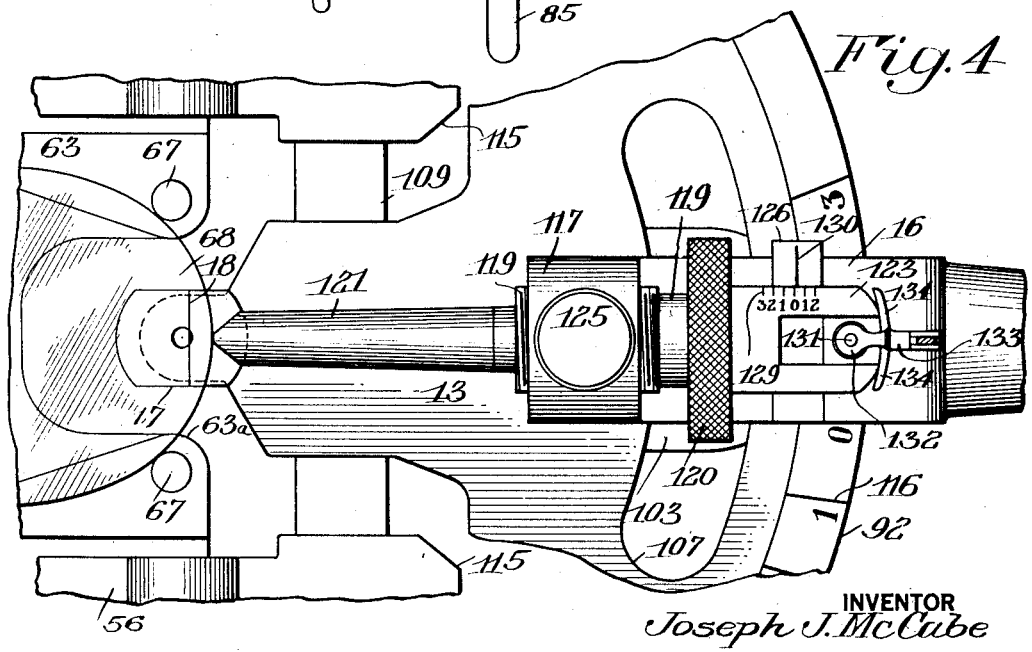
Figure 4 is a plan of a portion of the structure shown in Figure 3, on a larger scale.

Each chuck block may be provided with upstanding pins 67, spaced so as to form the corners of a rectangle whose length depends upon the distance the blocks are apart upon the guide rods 60. Thus when an ophthalmic lens 68 is to be mounted, it may be placed between the pins 67 as shown in Figures 3 and 5, and held in a particular position by the engagement of the pins with the periphery of the lens as the chuck blocks are brought together. The block 63 may have its edge toward the anvil recessed or notched as at 63ª (see Figures 3, 5 and 6) so as to clear the arm 16 and the anvil as the lens is carried over the anvil to the maximum desired extent.

Thus the chuck blocks may receive and mount lenses of different sizes by a mere separation and approach of the chuck blocks. The two chuck blocks may be provided with a pair of aligned grooves 69, (see Figure 7) for receiving tension springs 70. Each spring 70 is anchored at its ends by pins 71 to the chuck blocks, so as to normally pull the chuck blocks toward one another and clamp a lens between the pins of the two blocks, as shown in Figures 3 and 5. In order to prevent scratching of the lenses, part or all, of the pins 67 may be provided with upwardly convex rubber washers 72.

A lever arm 73 (Figures 3 and 5) of the platform or sub-frame is pivoted by a pin 75 to an ear 74 extends transversely across the underface of the sub-frame or platform and terminates forwardly in a supporting handle 76. Intermediate of its ends, the lever arm 73 is provided with a longitudinally extending slot 77, which slidably receives a pin 78 that depends from the chuck block 62. Thus when the lever arm 73 is oscillated above its pivot 75, the chuck block 62 will be shifted along the guide rods 60, and when shifted in a direction away from the chuck block 63, the latter will be pulled after the block 62 by the springs 70 which interconnect the two chuck blocks. A spring 79 may be coiled around the head of the pivot pin 75, with one end 80 anchored in a slot or aperture 81 of the head of the pin, and the other end 82 of the spring hooked over the lever 73 intermediate of its ends (see Figures 1, 3 and 6), so as to normally urge the lever 73 in a direction to shift the two chuck blocks together and toward the open or trunnion end of the platform or sub-frame.

A stop pin or screw 83 (see Figures 6 and 7) may depend from the lower face of the chuck block 63 for engagement against an edge of the cross bar 59 of the platform or sub-frame, after the chuck block 63 has followed the block 62 to a limited extent. Thus when the lever 73 is shifted in one direction (to the left in Figures 1, 3, 5 and 7) the two chuck blocks will be pulled also in the same direction and away from the anvil 17, until the stop pin 83 of the chuck block 63 engages with the cross bar 59, whereupon that chuck block will be held and the springs 70 tensioned, while the other chuck block 62 is pulled further in the same direction, thus effecting a separation of the chuck blocks against the action of the springs 70.

A lens 68 to be drilled may be inserted between the pins 67 of the chuck blocks thus separated, and when the lever 73 is then released, the spring 79 will shift it and the two blocks together toward the anvil 17. The chuck block 62 first approaches the block 63 until the lens is clamped between the pins, with the springs 70 still tensioned, and then the two blocks are shifted together toward the anvil for the continued movement of the lever arm 73, thus carrying the lens over the anvil to an extent which is predetermined in a manner to be explained shortly.

Referring now particularly to Figures 1, 6 and 7, one or both of the side arms of the platform or sub-frame 56, preferably at least the forward one, is downwardly extended on its lower edge and made arcuate about the axes of the trunnions, the arcuate surface or edge of at least one arm being provided with teeth or notches 84. Referring now particularly to Figure 2, a detent lever 85 is hinged as at 86 to the lower edge of an ear 87 on the lower edge of the forwardly extending arm 52. The lever 85 carries a blade 88 which extends upwardly through a slot 89 (see Figures 1 and 2) in the arm 52, so as to engage with the teeth or notches 84 of the platform or sub-frame when the lever is shifted upwardly.

The rearwardly extending arm of the lever 85 may be offset downwardly somewhat, and carry an upstanding pin 90. A helical spring 91 is placed over the pin 90 so as to be held in an upright position thereby, and extends upwardly beyond the pin to some extent so as to engage beneath the arm 52 and normally urge the rear end of the lever 85 downwardly and the detent blade 88 upwardly. When the forward end of the lever 85 is depressed to withdraw the detent blade 88 from engagement in the teeth or notches 84, the spring 91 will be compressed and will return the detent blade into locking position with the sub-frame or platform when the lever 85 is released. The whole platform or sub-frame 56 may be tilted upwardly or downwardly from the horizontal position, one downwardly tilted position being shown in Figure 6. The detent blade 88 will lock the sub-frame or platform in any of such angular positions.

The majority of the lenses to be drilled are arcuate and provided with either concave or convex surfaces and it is always desirable to drill in a direction normal to the surface being drilled at the point where the drilling occurs, and therefore, when the concave surface of a lens is being drilled, the platform mounting the lens should be tilted downwardly as shown in Figure 6, in order that surface of the lens being drilled will be approximately normal to the axis of the drill. The hole is drilled partly through with the lens in this position, and then when the lens is inverted in order to drill the other half from the other face, the platform should be tilted upwardly by a similar amount, so that the other face of the lens where the drilling occurs will be approximately normal to the axis of the drill.

The outer edge 92 of the platform 13 which is directly opposite the anvil from the platform or sub-frame 56, is arcuate with its center of curvature at the axis of the anvil spindle pin 14. The outer end 93 of the arm 16 which oscillates about the spindle of the anvil, overhangs and depends along the arcuate edge 92, as shown particularly in Figures 1 and 6. The inner edge or face of this depending portion 93 which is adjacent arcuate edge 92, is provided with a recess 94 (see Figure 6) for slidably receiving a collar 95 of a pin 96. The shank of the pin 96 is slidably mounted in an aperture 97 which connects the recess 94 with the outer side edge of the depending portion 93. A spring 98 is provided upon the shank of the pin 96 within the recess 94, so as to act under compression between the collar 95 and the inner end of the end wall of the recess.

The pin 96 is provided at the end adjacent the collar 95 with a projecting portion 99 which is adapted to snap into any one of a plurality of recesses 100 (see Figures 1, 2 and 6) when the pin is brought into alignment therewith and released. The outer end of the pin may carry a button or head 101 by which it may be drawn outwardly against the action of the spring 98 in order to withdraw the projecting end 99 from a recess 100 in which it may be disposed. The button 100 may for assembly purposes, be removably secured to the outer end of the pin in a suitable manner such as by locking pin 102 which passes through a boss of the button and the pin 96. Thus when the arm 16 is swung about its axis, the pin 96 will snap into one of the recesses 100 and lock the arm in that position.

A lever 103 (see Figure 6) is pivoted by a shouldered screw 104 to the underface of the platform 13, directly beneath the arm 16. The lever 103 at its outer end is provided with a slot 105 for receiving the shank of a shouldered screw 106 which is threaded into the lower face of the arm 16 and depends through an arcuate slot 107 in the platform 13, the center of curvature of the slot 107 being preferably approximately at the axis of the pivot pin 14 of the arm 16. Thus whenever the arm 16 is oscillated it will in turn oscillate the lever 103.

The platform 13 is also provided in its underface with a transversely extending groove or channel 108 (see Figure 6). This channel extends approximately parallel to the bearing trunnions 57 of the sub-frame or platform 56. A broad and somewhat shallow U shaped element 109 (see Figures 1, 2, 3, 6 and 9) is disposed with its cross arm section fitting the channel 108 and of a length greater than the length of the channel, so that the upstanding arms 110 of the element 109 will be spaced apart a greater distance than the width of the platform at that point, and the element will be able to slide endwise to some extent in the channel. The cross arm of the element 109 is provided in its lower face with a transversely extending slot 111 in which a shoe 112 reciprocates.

The lever 103 extends across the channel 108 and thus beneath the cross arm of the element 109, so as to confine the element 109 within the channel 108. A pin 113 extends upwardly from the lever 103 and is pivotally received in the shoe 112. Thus when the lever 103 is oscillated it will oscillate the shoe 112, and the latter will reciprocate the element 109 along the channel 108. The movement of the shoe 112 transversely of the element 109 in the slot 111 thereof, compensates for the difference between oscillating and reciprocating movement of the lever 103 and element 109. From this it will be observed that whenever the arm 16 is oscillated, the element 109 will be reciprocated.

The arms 110 of the element 109 are such a distance apart as to receive between them the side arms of the sub-frame or platform 56 as the later is swung about the upright standard into drilling position. Therefore, the inner faces or sides of the arms 110 are beveled off as at 114, and the ends of the side arms of the sub-frame or platform 56 are beveled off on one or both faces as at 115, so as to cooperate with the beveled faces 114 and direct the arms of the platform 56 between the arms 110 as the sub-frame or platform 56 is swung about the standard of the frame into lens drilling position. Thus as the platform 56 moves into drilling position, if it is not already properly in alignment with the space between the arms 110, the beveled surfaces 114 and 115 will cause a camming of the platform laterally, which is permitted by the sliding of the trunnions 57 in their supports, until the platform may move between the arms 110. For this reason, whenever the sub-frame or platform 56 is swung away from drilling position and then returned to drilling position it will always be properly centered with respect to the arms 110, regardless of the position into which it has been moved on the trunnions 57.

It will be observed that in this manner, the lateral displacement of the platform 56 will be dependent upon the position of the arm 16, and that by shifting the arm 16 the element 109 will be shifted laterally, and through its interengaging relation with the platform 56 will shift the latter in a direction lengthwise of its trunnions, so as to off-center the lens in either direction from an intermediate position corresponding to an intermediate normal angular position of the arm 16. This normal intermediate position is shown by a full line position of parts in Figure 3.

Suitable scale indications 116 may be provided upon the upper face of the platform 13, along the arcuate edge 92, for cooperation with an edge of the arm 16. Thus the position of the forward edge of the arm 16 with respect to the scale indications 116 will indicate the extent to which the arm 16 may be displaced if any, from its normal straight line position with respect to the platform 56, as shown in Figure 3. In Figure 5, the arm 16 is indicated as swung to one position, so as to offcenter the lens downwardly to some extent, which is desired for drilling a drop oval lens. This offcentering of the lens is necessary while it is being drilled. When such a drop oval lens is inverted, so as to drill the opposite face in completing the hole, the arm 16 must be shifted to the other side of its normal position an equal extent, so as to provide the same but opposite offcentering while the other half of the hole is being drilled.

The arm 16 is provided with an upstanding ear 117 having a transverse threaded aperture 118 which extends radially of the axis of the drill spindle. A sleeve 119 is threaded through the aperture 118, and is provided at its outer end with an operating head 120 having a knurled periphery to facilitate its rotation. A gauge spindle 121 has a reduced shank portion 122 which extends rotatably and axially through the sleeve 119, from end to end, with the shoulder between the reduced shank and the larger part of the gauge spindle abutting against that end of the sleeve 119 which is nearest to the anvil. The shoulder of the gauge spindle thus serves to limit the endwise movement of the shank 122 in the sleeve 119 in one direction. The projecting outer end of the shank 122 carries a collar 123 which may be secured thereon in any suitable manner, such as by a locking pin 124 which extends through both the shank 122 and the collar. The engagement of this collar 123 with the other end of the sleeve serves to prevent withdrawal of the gauge spindle from the sleeve. A set screw 125 having a knurled head may be provided in the ear 117, so as to engage the sleeve 119 and lock it in any adjusted position.

An L shaped bracket 126 is secured upon the upper face of the arm 16 in any suitable manner, such as by a screw 127 passing upwardly through the arm 16 and threaded into the base arm of the bracket 126, the base arm being preferably set or depressed somewhat into a recess or channel in the upper face of the arm 16, so as to be held against turning upon the screw 127 as an axis. The collar 123 is non-circular in periphery and is provided with a slot 128 that extends inwardly from its outer end face. The free arm of the bracket 126 extends along one side of and in close proximity to a face of the collar, so as to hold the collar against rotation with the sleeve, while permitting endwise movement of the collar with the spindle. Therefore, when the sleeve 119 is rotated, the gauge spindle will be held against rotation therewith and thus will be advanced toward or retracted from the anvil and drill spindle.

The upper face of the collar 123 along the bracket arm 126, may be provided with a suitable scale indications 129 (see Fig. 4) which cooperate with a suitable reference mark 130 provided upon the upper end face of the upright arm of the bracket 126. Thus as the head 120 of the sleeve 119 is rotated, the gauge spindle 121 will be advanced toward or retracted from the anvil by an amount which will be indicated by their relative movement between the scale indications 129 and reference mark 130. The gauge spindle extends into proximity to the anvil and at a level to be engaged by an edge of the lens 68, when the latter is carried upon the platform or sub-frame 56 in drilling position. By shifting the gauge spindle towards or away from the anvil, one can vary the extent to which the lens will project over the anvil, and thereby vary the distance from the edge that the hole will be drilled in the drilling operation.

The extreme tip or free end of the gauge spindle 121 may be chamfered or beveled so that as the arm 16 is oscillated, the nose of the gauge spindle will be relatively sharp and not affect the position of the lens.

A pin 131 is set into the arm 16 so as to extend upwardly therefrom and into the slot 128 of the collar 123 on the gauge spindle. The upper end of the end of the pin 131, which is within the slot 128, may differ in diameter throughout its length so as to correspond to the variations in diameters of the usual screws that connect the clamping ears of the eye-piece mount in which the lens is to be clamped, the larger diameter, of course, being lowermost. Therefore, referring particularly to Figure 4, it will be observed that the clamping ears 132 of the eye-piece mount 133 to which the lens is to be secured after the hole has been drilled, may be fitted over the pin 131, with the flanges 134 of the eye piece mount 133, which extend along the edge surface of the lens after the latter is inserted between the ears 132, abutting against the outer end face of the collar 123 or spaced slightly therefrom. The head 120 of the sleeve 119 may then be rotated to shift the collar 123 into contact with the flanges 134 of the eye piece mounting, and in that position the nose of the gauge spindle will be spaced from the drill spindle axis a distance equal to the distance from the pin 131 to the outer end face of the collar 133.

Where the lens has been drilled at that setting of the gauge spindle it will fit properly against the flanges 134, with the drilled lens hole in perfect alignment with the apertures of the clamping ears 132 of the eye piece mounting. Therefore, even though the apertures of the clamping ears 132 vary in their distance from the flanges 134, the holes will always be properly drilled regardless of such variations. Heretofore where errors have been made by drilling the hole at an incorrect distance from the lens edge, such as might be due to errors in measurement or in a setting of the gauge, it has been customary to bend the flanges 134 into contact with the lens periphery, but lenses so mounted soon work loose in their mounting, owing to the springing of the flanges 134. When the looseness becomes pronounced there is great danger of the lens breaking off through the hole which has been drilled. By actually using as the gauge, the eye piece mounting to which the lens is to be attached, such errors are positively avoided, and the operation of drilling is greatly facilitated, owing to the elimination of the necessity of measuring the distance from the apertures of the clamping ears 132 of the mounting to the flanges 134 and the subsequent setting of the gauge spindle according to those measurements.

Referring particularly to Figures 2 and 3, the sleeve 50 which carries the arm 52 is provided with a pair of bearing ears 135. A detent lever 136 is pivoted intermediate of its ends between the ears 135 and upon a pin 137 which extends between the ears and through the lever. One end of the lever 136 carries a pin 138 which extends through an aperture or slot 139 in the sleeve 50 and rides upon the surface of the shaft or rod 51 of the standard. The pin 138 is adapted to snap into a recess 140 in the surface of the rod or shaft 51, when the arm 52 is in drilling position, as shown in full lines in Figure 3. A pin 141 extends toward the sleeve surface from a lug 142 on the lever 136, and a compression spring 143 is disposed on said pin 141 under compression between the lug 142 and adjacent surface of the sleeve 50. The spring 143 thus serves to rock the lever 136 in a direction to carry the pin 138 against the surface of the rod or shaft 51 and snap it into the recess 140 when brought into alignment therewith.

The pin 138 may be threaded through an end of the lever 136 so as to be adjustable therethrough to different extents, and may be locked in any position into which it may be adjusted, by a lock nut 144. Thus by operating the lever 136 the sleeve 50 may be released for rotation upon the rod 51, and the arm 52, with the platform or sub-frame 56 may be swung away from the anvil and drill, to facilitate the changing of the position of the lens, or its removal or replacement. Thus when the platform is swung back into drilling position it will be locked in that position automatically by the snapping of the pin 138 into the recess 140.

In the use of a lens drill constructed as hereinbefore described and illustrated, the platfrom or sub-frame 56 may be released by an operation of the lever 136, and swung away from the anvil so as to be more readily accessible. The lever 76 may then be operated in a direction away from the anvil in order to separate the chuck blocks 62 and 63 sufficiently to receive the lens 68 to be drilled. Thereupon, when the lever 76 is released the chuck blocks will be drawn together by the springs 70 so as to clamp the lens between the pins 67 of the blocks. The spring 79 will also shift the lever 73 and through it the chuck blocks toward the trunnions 57, until the chuck block 63 reaches the ends of the guide rods 60 on the sub-frame or platform. The arm 52 may then be swung into drilling position and automatically locked by the engagement of the pin 138 in the recess 140. As the platform moves into drilling position, the beveled edges or noses 115 of the platform 56 will engage with the beveled faces 114 of the arms 110 cause a displacement of the platform along its trunnion axis until the frame or platform 56 moves entirely between the arms 110.

The lever 85 may be depressed in order to release the platform for tilting movement, after which the platform may be tilted until the surface of the lens where the hole is to be drilled is approximately normal to the drill axis, whereupon the lever 85, when released, will move the detent blade upwardly into engagement with one of the notches 85 of the platform in order to lock it in that angular position. It will be observed that by reason of the elongated blade 88, the platform or sub-frame 56 may be shifted laterally, that is, in a direction along the axis of the trunnions 57, without becoming disengaged from the detent blades.

The distance of the hole to be drilled from the edge of the lens may be ascertained, and the sleeve head 120 rotated to shift the gauge spindle endwise until the scale indications 129 and 130 (see Figure 4) indicate the desired distance of the hole from the edge of the lens. Thereupon the gauge spindle may be locked by the set screw 125. Preferably however, instead of setting the spindle gauge in this manner, the eye piece mounting is placed upon the pin 131 as illustrated and described, and the gauge spindle adjusted until the end face of the collar 123, engages the flanges 134 of the mounting 133, which automatically and accurately determines the proper position or adjustment of the gauge spindle. During this adjustment, the lens will be held yieldingly against the gauge spindle nose by the spring 79.

Before the hole in the lens is drilled, the button 101 should be pulled outwardly, and the arm 16 swung into the desired central or normal centering position for circular or elliptical lenses, as shown in Figure 3, or to one side of that position for off-centering drop oval lenses to be drilled, as shown in Figure 5. The belt connection to the spindle may be made effective so as to operate the drill, and while the drill is so operated the lever 23 may be rocked in order to force the drill against the lens. A suitable drill fluid may be employed around the drill, and the limit to which the drill may be lowered may be predetermined by the adjustment of the stop screw 31.

After the hole has been drilled partially through the lens, the drill is elevated, the arm 52 released and swung away from the anvil, and the lens inverted in position between the chuck blocks so as to present the faces in reversed position. The platform should also be tilted upwardly until the surface of the lens at the hole is again approximately normal to the drill, and the arm 52 returned to drilling position. If a drop oval lens is being drilled, the lens should be again offcentered in a reverse manner by a shifting of the arm 16 to a corresponding position upon the other side of its normal position. The other half of the hole may then be drilled and the entire hole reamed and finished. While the platform is away from the drilling position, it may, of course, be accidentally shifted laterally by reason of the sliding of its trunnions 57 in their supports, but when it is returned to drilling position it will automatically be centered by its engagement between the arms 110 as explained.

It will be obvious that various changes in the details, which have been herein described and illustrated in order to explain the nature of the invention, may be made by those skilled in the art within the principle and scope of the invention as expressed in the appended claims.

I claim as my invention:

1. In a lens drill, a frame having an upright standard, a bracket extending from said standard and carrying a drilling anvil and a limit stop, a drill spindle also carried by the frame in proper drilling relation to said anvil, a lens support hingedly mounted on said upright standard so as to swing horizontally thereon about said upright standard as a vertical axis, to shift a lens carried by said support into and out of drilling position, said lens when in drilling position being positioned over the anvil against said stop, and means for locking the support in drilling position.

2. In a lens drill, a frame having an upright standard, a drill spindle and cooperating anvil carried by said frame in operative relation to one another, a bracket hinged to said standard so as to swing about said upright standard as a vertical axis toward and from the anvil, a lens platform carried by said bracket for sliding movement crosswise of its hinge movement, said platform having means for receiving and holding a lens to be drilled, means for securing the bracket in drilling position, and means for shifting said platform slidingly in said bracket in order to offcenter the lens to any desired extent.

3. In a lens drill, a frame, a drill spindle and anvil carried by said frame in cooperative relation to one another, a lens platform having means to receive and support a lens between the drill spindle and anvil, means for mounting the platform for movement transverse to the axis of the spindle, a lens stop including a lens engaging portion movable in a curved path having its concave side toward the lens, and means for shifting said platform in either direction from an intermediate position for offcentering the lens to any desired extent.

4. In a lens drill, a frame, a drill spindle and anvil carried by said frame in cooperative relation to one another, a lens platform having means to receive and support a lens between the drill spindle and anvil, means for mounting the platform for movement transverse to the axis of the spindle, and means for shifting said platform in either direction from an intermediate position for offcentering the lens to any desired extent, said offcentering means comprising an arm hinged for oscillation about a vertical axis, means for securing the arm in different angular positions into which it may be adjusted, and connecting means between the arm and platform for shifting the latter transversely of the spindle axis by an amount and in a direction depending upon the movement of said arm from an intermediate normal position.

5. In a lens drill, a frame, a drill spindle and anvil carried by said frame in cooperative relation to one another, a lens platform having means to receive and support a lens between the drill spindle and anvil, means for mounting the platform for movement transverse to the axis of the spindle, and means for shifting said platform in either direction from an intermediate position for offcentering the lens to any desired extent, said means comprising an arm pivoted for oscillation horizontally about the axis of the drill spindle, means connecting said arm to said platform for shifting the latter transversely of the axis of the spindle in a direction and for an extent depending upon the angular movement of said arm from an intermediate normal position.

6. In a lens drill, a frame, a drill spindle and anvil carried by said frame in cooperative relation to one another, a lens platform having means to receive and support a lens between the drill spindle and anvil, means for mounting the platform for movement transverse to the axis of the spindle, means for shifting said platform in either direction from an intermediate position for offcentering the lens to any desired extent, said means comprising an arm pivoted for oscillation horizontally about the axis of the drill spindle, means connecting said arm to said platform for shifting the latter transversely of the axis of the spindle in a direction and for an extent depending upon the angular movement of said arm from an intermediate normal position and a lens stop carried by said arm for engagement by the lens to limit the extent the lens passes over the anvil.

7. In a lens drill, a frame, a drill spindle and anvil carried by said frame in cooperative relation to one another, a lens platform having means to receive and support a lens between the drill spindle and anvil, means for mounting the platform for movement transverse to the axis of the spindle, and means for shifting said platform in either direction from an intermediate position for offcentering the lens to any desired extent, said means comprising an arm pivoted for oscillation horizontally about the axis of the drill spindle, means connecting said arm to said platform for shifting the latter transversely of the axis of the spindle in a direction and for an extent depending upon the angular movement of said arm from an intermediate normal position and a lens stop carried by said arm for engagement by the lens to limit the extent that the lens passes over the anvil, said lens stop being adjustable radially of the axis of oscillation of the arm.

8. In a lens drill, a frame, a drill spindle and anvil carried thereby in cooperative relation to one another, a lens mount adjustable transversely of the axis of the drill spindle and having lens receiving and clamping means, an arm hinged for oscillation in a plane transverse to the axis of the drill spindle and about said axis, a lens stop carried by said arm for limiting the movement of the lens across the anvil, a member moving with said lens mount and having a slot extending transversely of its direction of movement, a shoe running in said slot, a lever hinged upon said frame for movement in a plane transverse to the axis of the spindle and having a pin and slot connection to said shoe, and also having a pin and slot connection to said arm.

9. In a lens drill, a frame, a drill spindle and anvil carried by said frame, in cooperative relation to one another, an arm hinged to said frame for oscillation about the axis of rotation of said spindle, means for supporting a lens between the spindle and anvil and displaceable for offcentering purposes and a connection between said arm and said support for causing such displacement upon the oscillation of said arm.

10. In a lens drill, a frame, a drill spindle and anvil carried by said frame in cooperative relation to one another, an arm hinged to said frame for oscillation about the axis of rotation of said spindle, means for supporting a lens between the spindle and anvil and displaceable for offcentering purposes, a connection between said arm and said support for causing such displacement upon the oscillation of said arm, and a limit stop carried by said arm for limiting the extent to which the lens overlaps the anvil.

11. In a lens drill, a frame, a drill spindle and anvil carried by the frame in cooperative relation to one another, a lens support carried by the frame having means for receiving and mounting a lens and movable toward and from the anvil to carry the lens across the axis of rotation of said spindle to some extent, said lens support being also movable laterally of its movement above mentioned, a member carried by said frame and movable in a direction parallel to said lateral movement of said support, said member and support having interengaging parts effective when the support is brought into a position to place the lens over the anvil for shifting said support laterally to either side from a normal position to an extent depending upon the position of said member on said frame, and means carried by said frame for shifting said member in either direction from a normal intermediate position to variable extents to effect variable offcentering of a lens carried by said support.

12. In a lens drill, a frame, a drill spindle and anvil carried by the frame in cooperative relation to one another, a lens support carried by the frame having means for receiving and mounting a lens and movable toward and from the anvil to carry the lens across the axis of rotation of said spindle to some extent, said lens support being also movable laterally of its movement above mentioned, a member carried by said frame and movable in a direction parallel to said lateral movement of said support, said member and support having interengaging parts effective when the support is brought into a position to place the lens over the anvil for shifting said support laterally to either side from a normal position to an extent depending upon the position of said member on said frame, and means carried by said frame for shifting said member in either direction from a normal intermediate position to variable extents to effect variable offcentering of a lens carried by said support, said means including an arm oscillating in a plane transverse to the axis of said spindle, means for securing the arm in different angular positions and means interconnecting the arm and member for transmitting motion between them.

13. In a lens drill, a frame, a drill spindle and anvil carried by the frame in cooperative relation to one another, a lens support carried by the frame having means for receiving and mounting a lens and movable toward and from the anvil to carry the lens across the axis of rotation of said spindle to some extent, said lens support being also movable laterally of its movement above mentioned, a member carried by said frame and movable in a direction parallel to said lateral movement of said support, said member and support having interengaging parts effective when the support is brought into a position to place the lens over the anvil for shifting said support laterally to either side from a normal position to an extent depending upon the position of said member on said frame, and means carried by said frame for shifting said member in either direction from a normal intermediate position to variable extents to effect variable offcentering of a lens carried by said support, said means including an arm oscillatable in a plane transverse to the axis of the spindle, a lever hinged to said frame for movement about an axis parallel to the spindle axis and having pin and slot connections to said arm and member for effecting a movement transfer between said arm and member.

14. In a lens drill, a frame, a drill spindle and anvil carried by the frame in cooperative relation to one another, a lens support carried by the frame having means for receiving and mounting a lens and movable toward and from the anvil to carry the lens across the axis of rotation of said spindle to some extent, said lens support being also movable laterally of its movement above mentioned, a member carried by said frame and movable in a direction parallel to said lateral movement of said support, said member and support having interengaging parts effective when the support is brought into a position to place the lens over the anvil for shifting said support laterally to either side from a normal position to an extent depending upon the position of said member on said frame, and means carried by said frame for shifting said member in either direction from a normal intermediate position to variable extents to effect variable offcentering of a lens carried by said support, said means including an arm oscillatable about the axis of said spindle, means interconnecting the arm and member for transmitting movement between them, and a lens limit stop carried by said arm and adjustable thereon laterally of its axis of oscillation for limiting the distance of the edge of the lens from the axis of the spindle for the holes to be drilled.

15. In a lens drill, a frame, a drill spindle and anvil carried thereby in cooperative relation to one another, a supporting element carried by said frame for movement in a plane transverse to the axis of said spindle, a sub-frame having trunnions rotatably and slidably mounted in said support with the axis of the trunnions in the plane of the spindle axis when said support is in drilling position, lens receiving and clamping means carried by said sub-frame for movement to carry a lens partially across the anvil, whereby said lens may be rocked to a limited extent into positions oblique to the axis of the spindle to enable drilling of an aperture in said lens in a direction approximately normal to the lens surface at the point of drilling, regardless of its curvature, said sub-frame being shiftable along the axis of the trunnions for offcentering purposes by sliding said trunnions axially relatively to said supporting element, and latching mechanism for holding said sub-frame in adjusted oblique position while permitting movement thereof along said axis of said trunnions.

16. In a lens drill, a frame, a drill spindle and anvil carried by said frame in cooperative relation to one another, a sub-frame hinged to said frame for oscillation about an axis in the plane of and transverse to the axis of said spindle and being adjustable longitudinally of said axis, lens receiving and supporting means carried by said sub-frame and movable thereon to carry a lens into position between the spindle and anvil for drilling purposes, and means mounted on said frame for holding said sub-frame in any of different angular adjusted positions oblique to the axis of the drill spindle during adjustment thereof longitudinally of said axis, said holding means and sub-frame moving relative to each other during such longitudinal adjustment.

17. In a lens drill, a frame, a drill spindle and anvil carried by said frame in cooperative relation to one another, a sub-frame hinged to said frame for oscillation about an axis in the plane of and transverse to the axis of said spindle, lens receiving and supporting means carried by said sub-frame and movable thereon to carry a lens into position between the spindle and anvil for drilling purposes, means mounted on said frame for holding said sub-frame in any of different angular adjusted positions oblique to the axis of the drill spindle, and means for shifting said sub-frame in a direction longitudinally of its pivotal axis while said holding means is in operating position with respect to the sub-frame, said holding means and sub-frame moving relative to each other during such longitudinal shifting.

18. In a lens drill, a frame, a drill spindle and anvil carried thereby in cooperative relation to one another, means for receiving and mounting a lens between said spindle and anvil, said means being connected to said frame for movement into and out of a position in which the lens is between the spindle and anvil, whereby the lens may be first attached to said means and then shifted into position between the anvil and spindle, the lens carrying part of said means being also shiftable laterally of the axis of said spindle for offcentering purposes and means carried by the frame and cooperating with said lens receiving and mounting means only when said last-named means is in position for placing the lens between the anvil and spindle, for shifting the lens carrying part of said receiving and mounting means laterally to offcenter the lens.

19. In a lens drill, a frame, a drill spindle and anvil carried thereby in cooperative relation to one another, means for receiving and mounting a lens with an edge portion between the spindle and anvil, and shiftable about an axis transverse to and in the plane of the axis of said spindle and in proximity to said anvil for tilting a lens carried thereby into different oblique positions with respect to said spindle axis, said means being also shiftable in a direction lengthwise of the tilting axis for offcentering purposes and means carried by said frame extending transversely of said tilting axis for shifting said lens receiving and mounting means in an offcentering movement without limiting its tilting movement, said shifting means cooperating with said lens receiving and mounting means when said receiving and mounting means is in one position and being operatively disconnected from said receiving and mounting means when the latter is in a second position.

20. In a lens drill, a frame, a drill spindle and anvil carried thereby in cooperative relation to one another, means for receiving and mounting a lens with an edge portion between the spindle and anvil, and shiftable about an axis transverse to and in the plane of the axis of said spindle and in proximity to said anvil for tilting a lens carried thereby into different oblique positions with respect to said spindle axis, said means being also shiftable in a direction lengthwise of the tilting axis for offcentering purposes and means carried by said frame for shifting said lens receiving and mounting means in an offcentering movement without limiting its tilting movement, said last named means including an arm oscillatable about an axis parallel to the spindle axis, and transfer mechanism between said arm and the lens receiving and supporting means.

21. In a lens drill, a frame, a drill spindle and anvil carried thereby in cooperative relation to one another, and means for receiving and mounting a lens with an edge portion between the spindle and anvil, and shiftable about an axis transverse to and in the plane of the axis of said spindle and in proximity to said anvil for tilting a lens carried thereby into different oblique positions with respect to said spindle axis, said means being also shiftable in a direction lengthwise of the tilting axis for offcentering purposes, means carried by said frame for shifting said lens receiving and mounting means in an offcentering movement without limiting its tilting movement, said shifting means including an arm oscillatable about the axis of said spindle, means connecting said arm to said lens receiving and mounting means for causing an offcentering movement of the latter upon an oscillation of said arm, and a limit gauge carried by said arm so as to limit the movement of the edge of said lens over the anvil to an extent corresponding to the distance between the edge of the lens and the aperture to be drilled.

22. In a lens drill, a frame, a drill spindle and anvil carried thereby in cooperative relation to one another, means for receiving and mounting a lens with an edge portion between the spindle and anvil, and shiftable about an axis transverse to and in the plane of the axis of said spindle and in proximity to said anvil for tilting a lens carried thereby into different oblique positions with respect to said spindle axis, said means being also shiftable in a direction lengthwise of the tilting axis for offcentering purposes, means carried by said frame for shifting said lens receiving and mounting means in an offcentering movement without limiting its tilting movement, said shifting means including an arm oscillatable about the axis of said spindle, means connecting said arm to said lens receiving and mounting means for causing an offcentering movement of the latter upon an oscillation of said arm, and a limit gauge carried by said arm and adjustable toward and from the axis of oscillation of said arm so as to limit the movement of the edge of said lens over the anvil to an extent corresponding to the distance between the edge of the lens and the aperture to be drilled.

23. In a lens drill, a frame having an upright standard, a drill spindle and anvil carried by the frame in cooperative relation to one another, a member hinged to said standard for movement transversely to said spindle axis, means for securing said member in one position into which it may be swung, an element having a trunnion engagement with said member for a trunnion movement thereon about an axis in the plane of and intersecting said spindle axis, said element having means for receiving and mounting a lens between the anvil and spindle when said member is in secured position, said element having an arcuate surface extending about the axis of tilting and also having depressions in said arcuate surface, and detent means carried by said member for engagement with any of said depressions which may be brought into alinement thereof during the tilting of said element, for locking said element in any tilted position.

24. In a lens drill, a frame having an upright standard, a drill spindle and anvil carried by the frame in cooperative relation to one another, a member hinged to said standard for movement transversely to said spindle axis, means for securing said member in one position into which it may be swung, an element having a trunnion engagement with said member for a trunnion movement thereon about an axis in the plane of and intersecting said spindle axis, said element having means for receiving and mounting a lens between the anvil and spindle when said member is in secured position, said element having an arcuate surface extending about the axis of tilting and also having depressions in said arcuate surface, a lever pivoted on said member and having a detent movable into any of said depressions which may be brought into alinement therewith during tilting of said element, whereby the said element may be locked in any tilted position, and spring means for resiliently urging said lever in a direction to project said detent into a depression.

25. In a lens drill, a frame having an upright standard, a drill spindle and anvil carried by the frame in cooperative relation to one another, a member hinged to said standard for movement transversely to said spindle axis, means for securing said member in one position into which it may be swung, an element having a trunnion engagement with said member for a trunnion movement thereon about an axis in the plane of and intersecting said spindle axis, said element having means for receiving and mounting a lens between the anvil and spindle when said member is in secured position, said element having an arcuate surface extending about the axis of tilting and also having depressions in said arcuate surface, detent means carried by said member for engagement with any of said depressions which may be brought into alinement thereof during the tilting of said element, for locking said element in any tilted position, said element being also shiftable along its axis of tilting for offcentering purposes without disengagement from said detent, and means for shifting said element along its axis of tilting in order to effect the desired offcentering.

26. In a lens drill, a frame having an upright standard, a drill spindle and anvil carried by the frame in cooperative relation to one another, a member hinged to said standard for movement transversely to said spindle axis, means for securing said member in one position into which it may be swung, an element having a trunnion engagement with said member for a trunnion movement thereon about an axis in the plane of and intersecting said spindle axis, said element having means for receiving and mounting a lens between the anvil and spindle when said member is in secured position, said element having an arcuate surface extending about the axis of tilting and also having depressions in said arcuate surface, detent means carried by said member for engagement with any of said depressions which may be brought into alinement thereof during the tilting of said element, for locking said element in any tilted position, said element being also shiftable along its axis of tilting for offcentering purposes without disengagement from said detent, and means for shifting said element along its axis of tilting in order to effect the desired offcentering, said last named means including an arm oscillatable about an axis parallel to the spindle axis, and motion transmitting means interconnecting the said arm and said element for shifting it along its tilting axis without interfering with its tilting movement.

27. In a lens drill, a frame having an upright standard, a drill spindle and anvil carried by the frame in cooperative relation to one another, a member hinged to said standard for movement transversely to said spindle axis, means for securing said member in one position into which it may be swung, an element having a trunnion engagement with said member for a trunnion movement thereon about an axis in the plane of and intersecting said spindle axis, said element having means for receiving and mounting a lens between the anvil and spindle when said member is in secured position, said element having an arcuate surface extending about the axis of tilting and also having depressions in said arcuate surface, detent means carried by said member for engagement with any of said depressions which may be brought into alinement thereof during the tilting of said element, for locking said element in any tilted position, said element being also shiftable along its axis of tilting for offcentering purposes without disengagement from said detent, means for shifting said element along its axis of tilting in order to effect the desired offcentering, and including an arm oscillatable about the axis of said drill spindle and interconnected with said element for shifting it along its tilting axis without interfering with its tilting movement, and a limit gauge carried by said arm for limiting the extent to which the lens edge will overlie the anvil, whereby the distance of the aperture to be drilled in the lens from its edge will be determined.

28. In a lens drill, a frame having an upright standard, a drill spindle and anvil carried by the frame in cooperative relation to one another, a member hinged to said standard for movement transversely to said spindle axis, means for securing said member in one position into which it may be swung, an element having a trunnion engagement with said member for a trunnion movement thereon about an axis in the plane of and intersecting said spindle axis, said element having means for receiving and mounting a lens between the anvil and spindle when said member is in secured position, said element having an arcuate surface extending about the axis of tilting and also having depressions in said arcuate surface, detent means carried by said member for engagement with any of said depressions which may be brought into alinement thereof during the tilting of said element, for locking said element in any tilting position, said element being also shiftable along its axis of tilting for offcentering purposes without disengagement from said detent, means for shifting said element along its axis of tilting in order to effect the desired offcentering, and including an arm oscillatable about the axis of said drill spindle and interconnected with said element for shifting it along its tilting axis without interfering with its tilting movement, and a limit gauge carried by said arm for limiting the extent to which the lens edge will overlie the anvil, whereby the distance of the aperture to be drilled in the lens from its edge will be determined, said gauge being adjustable radially of said spindle axis so as to vary the distance of the aperture being drilled from the edge of the lens.

29. In a lens drill, a frame, a drill spindle and anvil carried thereby in cooperative relation to one another, means for supporting a lens between the spindle and anvil, a limit gauge carried by said frame for engagement by the edge of the lens whereby the distance that the edge portion of the lens overlaps the anvil will be determined, said gauge being adjustable radially of the axis of the spindle to vary such distance, said gauge and frame having cooperating parts, one of said parts including a pin over which an eye of the lens receiving and clamping ears of the eyepiece mounting may be passed, with the eyepiece mounting supported therefrom, and the other of said parts having abutment means for engagement with the lens periphery engaging flanges of the eyepiece mounting during such adjustment for limiting such adjustment, whereby said gauge may be adjusted to an extent which will position the edge of the lens at a distance from the drill spindle axis corresponding to the distance between the said apertures of said eyepiece flanges and the apertures in the eyes of the lens clamping ears which are mounted on said pin.

30. In a lens drill, a frame, a drill spindle and anvil carried by said frame in cooperative relation to one another, means for receiving and mounting a lens between the anvil and spindle, said frame having a threaded socket extending toward and from the anvil, a sleeve threaded into said socket so as to be adjustable toward and from the anvil when rotated, a gauge spindle passing through and rotatable in said sleeve and having abutments engaging with each end of said sleeve to permit relative rotation of the sleeve and gauge spindle and prevent their relative endwise displacement, and means carried by the frame and cooperating with said gauge spindle for holding it against rotation with said sleeve, whereby when said sleeve is rotated the gauge spindle will be given a movement of translation toward and from the anvil for limiting the extent to which the lens edge portion may project across the axis of the drill spindle and thus limit the distance of the aperture to be drilled from the edge of the lens.

31. In a lens drill, a frame, a drill spindle and anvil carried by said frame in cooperative relation to one another, means for receiving and mounting a lens between the anvil and spindle, said frame having a threaded socket extending toward and from the anvil, a sleeve threaded into said socket so as to be adjustable toward and from the anvil when rotated, a gauge spindle passing through and rotatable in said sleeve and having abutments engaging with said sleeve to permit relative rotation of the sleeve and gauge spindle and prevent their relative endwise displacement, and means carried by the frame and cooperating with said gauge spindle for holding it against rotation with said sleeve, whereby when said sleeve is rotated the gauge spindle will be given a movement of translation toward and from the anvil for limiting the extent to which the lens edge portion may project across the axis of the drill spindle and thus limit the distance of the aperture to be drilled from the edge of the lens, said holding means and said gauge spindle having cooperative scale indications for indicating the relative translation movements of said gauge spindle.

32. In a lens drill, a frame, a drill spindle and anvil carried by the frame in cooperative relation to one another, means for supporting a portion of the lens between the anvil and spindle where an aperture is to be drilled, a gauge element adjustable toward and from the spindle axis for limiting the extent to which the edge portion of the lens may extend across the axis of the drill spindle and thereby varying the distance of the aperture to be drilled from the edge of the lens, said gauge element and frame constituting two relatively movable parts, a pin carried by one of said parts for receiving and mounting the lens embracing ears of an eyepiece lens mount, and the other of said parts having abutment means with which the lens engaging flanges of the eyepiece mount may engage upon relative movement of said parts, whereby the movement of said gauge element will be limited by the engagement of said abutment means with the flanges of the eyepiece lens mounting and thereby the distance of the aperture to be drilled from the edge of the lens determined.

33. In a lens drill, a frame, a drill spindle and anvil carried by the frame in cooperative relation to one another, means for receiving and supporting a lens between the anvil and drill spindle, a gauge element carried by said frame for movement toward and from the drill spindle axis so as to engage the edge of the lens to be drilled and limit the extent to which its edge will project beyond the spindle axis and thereby determine the distance of the aperture to be drilled from the edge of the lens, said gauge element having a slot extending inwardly from its outer end, a pin carried by said frame and projecting into said slot and of a size to pass through the apertures in the lens clamping ears of an eyepiece lens mount, with the flanges of said mount disposed across the outer slotted end of the element, whereby the relative movement of said gauge element may be limited by the engagement of said flanges of the lens mount with the slotted end of the gauge element.

34. In a lens drill, a frame, a drill spindle and anvil carried thereby in cooperative relation to one another, means for receiving and supporting a lens between the spindle and anvil, said frame having a passage extending radially of the spindle axis, a sleeve threaded through said passage so as to be adjustable therethrough to various extents when rotated, a gauge pin extending axially through said sleeve and having a shoulder engageable with one end of said sleeve for limiting their relative sliding movement in one direction, and a collar carried by the pin and engaging with the other end of said sleeve for limiting their sliding movement in the opposite direction whereby upon rotation of said sleeve the gauge pin will be shifted toward and from the axis of the drill spindle to limit the extent that the edge of the lens supported across the anvil will extend from said spindle axis.

35. In a lens drill, a frame, a drill spindle and anvil carried thereby in cooperative relation to one another, means for receiving and supporting a lens between the spindle and anvil, said frame having a passage extending radially of the spindle axis, a sleeve threaded through said passage so as to be adjustable therethrough to various extents when rotated, a gauge pin extending axially through said sleeve and having a shoulder engageable with one end of said sleeve for limiting their relative sliding movement in one direction, and a collar carried by the pin and engaging with the other end of said sleeve for limiting their sliding movement in the opposite direction whereby upon rotation of said sleeve the gauge pin will be shifted toward and from the axis of the drill spindle to limit the extent that the edge of the lens supported across the anvil will extend from said spindle axis, said frame having a part cooperating with said collar to prevent rotation of said gauge pin with the sleeve, said part and collar having abutting surfaces carrying cooperating scale indications for indicating the position of the gauge pin.

36. In a lens drill, a frame, a drill spindle and anvil carried thereby in cooperative relation to one another, means for receiving and supporting a lens between the spindle and anvil, said frame having a passage extending radially of the spindle axis, a sleeve threaded through said passage so as to be adjustable therethrough to various extents when rotated, a gauge pin extending axially through said sleeve and having a shoulder engageable with one end of said sleeve for limiting their relative sliding movement in one direction, a collar carried by the pin and engaging with the other end of said sleeve for limiting their sliding movement in the opposite direction, whereby upon rotation of said sleeve the gauge pin will be shifted toward and from the axis of the drill spindle to limit the extent that the edge of the lens supported across the anvil will extend from said spindle axis, said frame having a part cooperating with said collar to prevent rotation of said gauge pin with the sleeve, said part and collar having abutting surfaces carrying cooperating scale indications for indicating the position of the gauge pin, said collar being also slotted inwardly from its outer end, and a pin carried by said frame and projecting into said slot whereby the lens clamping ears of an eyepiece lens mount may be fitted upon said pin, with the apertures in said ears receiving the pin, and with the flanges of the mount that engage the periphery of the lens disposed across the slotted end of the collar, so as to limit by engagement with the end of the collar the adjustment of the gauge pin.

37. In a lens drill, a frame, a drill spindle carried by said frame, a pin carried by said frame and aligned with the axis of said drill spindle, an anvil carried by said pin for cooperation with said drill spindle, an arm pivoted upon said pin for oscillation about the axis of said spindle means for receiving and supporting a lens between the spindle and anvil, and means operated by the oscillation of said arm for causing a relative offcentering movement between the lens receiving and supporting means in said spindle.

38. In a lens drill, a frame, a drill spindle and anvil carried thereby in cooperative relation to one another, a pair of brackets carried by said support, one of said brackets being pivotally mounted on said frame for movement in a direction transverse to the spindle axis and having means for receiving and mounting a lens, whereby the lens may be moved into position between the spindle and anvil for drilling purposes, the other bracket being relatively fixed, said lens mounting means of said bracket being adjustable on said bracket in a direction transverse to the axis of the spindle for offcentering the lens, a member carried by said relatively fixed bracket for movement in the direction of offcentering movement of the lens mounting means and having an interengagement with said lens mounting means to cause their adjustment together during the offcentering movement, said member having a slot extending transversely to its direction of movement, a shoe running in said slot in a direction transverse to the movement of said member, and a lever pivoted to said relatively fixed bracket and having a pivotal connection to said shoe whereby when said lever is oscillated said member will be shifted in an offcentering movement.

39. In a lens drill, a frame, a drill spindle and anvil carried thereby in cooperative relation to one another, a pair of brackets carried by said support, one of said brackets being pivotally mounted on said frame for movement in a direction transverse to the spindle axis and having means for receiving and mounting a lens, whereby the lens may be moved into position between the spindle and anvil for drilling purposes, the other bracket being relatively fixed, said lens mounting means of said bracket being adjustable on said bracket in a direction transverse to the axis of the spindle for offcentering the lens, a member carried by said relatively fixed bracket for movement in the direction of offcentering movement of the lens mounting means and having an interengagment with said lens mounting means to cause their adjustment together during the offcentering movement said member having a slot extending transversely to its direction of movement, a shoe running in said slot, in a direction transverse to the movement of said member, a lever pivoted to said relatively fixed bracket and having a pivotal connection to said shoe whereby when said lever is oscillated said member will be shifted in an offcentering movement an arm also pivoted upon said bracket for oscillation in a plane parallel to the movement of said lever and having a pin and slot connection to said lever whereby oscillation of said arm will cause oscillation of said lever, and means for shifting said arm and holding it in different offcentering adjustment positions.

40. In a lens drill, a frame, a drill spindle and anvil carried thereby in cooperative relation to one another, a pair of brackets carried by said support, one of said brackets being pivotally mounted on said frame for movement in a direction transverse to the spindle axis and having means for receiving and mounting a lens, whereby the lens may be moved into position between the spindle and anvil for drilling purposes, the other bracket being relatively fixed, said lens mounting means of said bracket being adjustable on said bracket in a direction transverse to the axis of the spindle for offcentering the lens, a member carried by said relatively fixed bracket for movement in the direction of offcentering movement of the lens mounting means and having an interengagement with said lens mounting means to cause their adjustment together during the offcentering movement said member having a slot extending transversely to its direction of movement, a shoe running in said slot, in a direction transverse to the movement of said member, a lever pivoted to said relatively fixed bracket and having a pivotal connection to said shoe whereby when said lever is oscillated said member will be shifted in an offcentering movement an arm also pivoted upon said bracket for oscillation in a plane parallel to the movement of said lever and having a pin and slot connection to said lever whereby oscillation of said arm will cause oscillation of said lever, means for shifting said arm and holding it in different offcentering adjustment positions, the axis of oscillation of said arm being coincident with the spindle axis, and a gauge element carried by said arm for limiting the movement of a lens across the spindle axis and thereby fixing the distance of the aperture to be drilled from the edge of the lens.

41. In a lens drill, a frame, a drill spindle and anvil carried thereby in cooperative relation to one another, a pair of brackets carried by said support, one of said brackets being pivotally mounted on said frame for movement in a direction transverse to the spindle axis and having means for receiving and mounting a lens, whereby the lens may be moved into position between the spindle and anvil for drilling purposes, said lens mounting means of said bracket being adjustable on said bracket in a direction transverse to the axis of the spindle for offcentering the lens, the other bracket being relatively fixed, a member carried by said relatively fixed bracket for movement in the direction of offcentering movement of the lens mounting means and having an interengagement with said lens mounting means to cause their adjustment together during the offcentering movement, said member having a slot extending transversely to its direction of movement, a shoe running in said slot in a direction transverse to the movement of said member, and a lever pivoted to said relatively fixed bracket and having a pivotal connection to said shoe whereby when said lever is oscillated said member will be shifted in an offcentering movement, said lens supporting means and said member carried by said relatively fixed bracket having cooperating guide means for causing a shifting movement of said lens mounting means into a desired relation to the offcentering means, automatically, whenever the relatively movable bracket is swung into drilling position.

42. In a lens drill, a frame, a drill spindle and anvil carried by the frame in cooperative relation to one another, and a platform carried by said frame for supporting a lens to be drilled between the anvil and drill spindle, said platform comprising a sub-frame section having rods extending in a direction transverse to the spindle axis, a pair of clamping blocks having passages through which said rods pass, whereby the blocks will be slidable upon said rods toward and from the anvil, a pair of spaced pins carried by each block for receiving between them a lens, whereby the lens will be held against displacement and in a predetermined definite position, spring means connecting said blocks together to yieldingly urge them toward one another and clamp between them a lens disposed between the pins of the blocks, means for normally urging both of said blocks and lens into a position across the anvil, and a gauge mounted on said frame for limiting the movement of the lens and blocks across the anvil, said gauge having a lens engaging portion movable in a curved path having its concave side toward the lens.

43. In a lens drill, a frame, a drill spindle and anvil carried by the frame in cooperative relation to one another, and a platform carried by said frame for supporting a lens to be drilled between the anvil and drill spindle, said platform comprising a sub-frame section having rods extending in a direction transverse to the spindle axis, a pair of clamping blocks having passages through which said rods pass, whereby the blocks will be slidable upon said rods toward and from the anvil, a pair of spaced pins carried by each block for receiving between them a lens, whereby the lens will be held against displacement and in a predetermined definite position, spring means connecting said blocks together to yieldingly urge them toward one another and clamp between them a lens disposed between the pins of the blocks, means for normally urging both of said blocks and lens into a position across the anvil, and a gauge mounted on said frame in a position to be engaged by the lens for limiting the movement of the lens and blocks across the anvil, said gauge being pivoted for an angular adjusting movement about an axis substantially in alinement with said drill spindle as a center.

44. In a lens drill, a frame, a drill spindle and anvil carried thereby in cooperative relation to one another, a sub-frame supported upon said main frame and having guide rods extending parallel to one another and in a plane transverse to the axis of the spindle, lens clamping blocks slidably mounted on said rods and having means for receiving and holding a lens between them and for shifting the lens across the axis of the drill spindle, spring means connecting said blocks to normally urge them together, and means for limiting the travel of said blocks along the guide rods in carrying the lens over the anvil, said limiting means comprising an adjustable gauge including a lens engaging portion movable in a curved path having its concave side toward the lens.

45. In a lens drill, a frame, a drill spindle and anvil carried thereby in cooperative relation to one another, a sub-frame supported upon said main frame and having guide rods extending parallel to one another and in a plane transverse to the axis of the spindle, lens clamping blocks slidably mounted on said rods and having means for receiving and holding a lens between them and for shifting the lens across the axis of the drill spindle, spring means connecting said blocks to normally urge them together, means for limiting the travel of said blocks along the guide rods in carrying the lens over the anvil, and a spring actuated lever for shifting the blocks toward said limiting means, said lever having a projecting portion forming a handle by which the blocks may be retracted away from said limiting means.

46. In a lens drill, a frame, a drill spindle and anvil carried thereby in cooperative relation to one another, a sub-frame carried by the main frame and having a plurality of guide rods extending in a plane approximately transverse to the axis of the drill spindle, a pair of clamping blocks slidable in tandem fashion upon said guide rods, said blocks having means to receive between them and support a lens to be drilled and shift it over the anvil to a desired extent, a spring connecting the two blocks, a lever hinged to the frame and having a pin and slot connection to one of said blocks, and a spring element for normally urging said lever in a direction to carry said blocks across the axis of the drill spindle, said lever having a projecting portion forming a handle by which the blocks may be retracted away from said limiting means.

47. In a lens drill, a frame, a drill spindle and anvil carried thereby in cooperative relation to one another, a sub-frame carried by said main frame and having guide rods extending in a plane transverse to the axis of the drill spindle, lens mounting and clamping blocks for receiving and supporting a lens to be drilled, spring means urging said blocks toward one another so as to receive and clamp a lens between them and movable together along said guide rods to carry the lens across the anvil to a desired extent, a lever carried by said sub-frame and having a pin and slot connection to the said block which is the further from the anvil, a spring element for normally urging said lever in a direction to shift said blocks to various extents across said anvil, and means for limiting the extent to which said blocks may carry said lens over the anvil, said lever having a projecting portion forming a handle by which the blocks may be retracted away from said limiting means.

48. In a lens drill, a frame, a drill spindle and anvil carried thereby in cooperative relation to one another, guide rods carried by said frame and extending in a plane transverse to the axis of the drill spindle, lens mounting and clamping blocks carried by and slidable upon said rods in tandem fashion, a pin carried by the block nearest the anvil slidably guided in the other of said blocks and extending through and slidable in a portion of said frame for movement relative to said rods, and means for urging said blocks together to clamp a lens, and means to move the two blocks together in a direction to carry a lens clamped therebetween across the anvil.

49. In a lens drill, a frame, a drill spindle and anvil carried thereby in cooperative relation to one another, guide rods carried by said frame and extending in a plane transverse to the axis of the drill spindle, lens mounting and clamping blocks carried by and slidable upon said rods in tandem fashion, a pin carried by the block nearest the anvil slidably guided in the other of said blocks and extending through and slidable in a portion of said frame for movement relative to said rods, a spring connecting said blocks to normally urge them toward one another, and means for shifting the block further from the anvil toward and from the anvil.

50. In a lens drill, a frame, a drill spindle and anvil carried thereby in cooperative relation to one another, guide rods carried by said frame and extending in a plane transverse to the axis of the drill spindle, lens mounting and clamping blocks carried by and slidable upon said rods in tandem fashion, a pin carried by the block nearest the anvil slidably guided in the other of said blocks and extending through and slidable in a portion of said frame for movement relative to said rods, a spring connecting said blocks to normally urge them toward one another, means for shifting the block further from the anvil toward and from the anvil, said block nearest the anvil and said frame having cooperating parts limiting the travel of said block away from the anvil, whereby when the block further from the anvil is shifted away from the anvil, both blocks will move away from the anvil to a limited extent, and then separate from one another during continuance of the same movement of said further block.

51. In a lens drill, a frame, a drill spindle and anvil carried by said frame in cooperative relation with respect to each other, a lens holder adjustable transversely of the axis of the spindle and a lens stop movable to different angular positions with respect to the lens holder, in the plane of a lens carried by said holder.

JOSEPH J. McCABE.